US008769860B2

(12) United States Patent  
Bain

(10) Patent No.: US 8,769,860 B2  
(45) Date of Patent: Jul. 8, 2014

(54) TURKEY TAIL FAN SUPPORT DECOY

(76) Inventor: Matthew R. Bain, Colby, KS (US)

( * ) Notice: Subject to any disclaimer, the term of this patent is extended or adjusted under 35 U.S.C. 154(b) by 145 days.

(21) Appl. No.: 13/211,989

(22) Filed: Aug. 17, 2011

(65) Prior Publication Data

US 2012/0042561 A1 Feb. 23, 2012

Related U.S. Application Data

(60) Provisional application No. 61/374,568, filed on Aug. 17, 2010, provisional application No. 61/375,211, filed on Aug. 19, 2010.

(51) Int. Cl.  
*A01M 31/06* (2006.01)

(52) U.S. Cl.  
USPC .................................................... 43/2

(58) Field of Classification Search  
USPC ............................................. 43/2, 3, 21.2  
IPC ............................................... A01M 31/06  
See application file for complete search history.

(56) References Cited

U.S. PATENT DOCUMENTS

| | | | |
|---|---|---|---|
| 2,828,096 A * | 3/1958 | Beri | 43/21.2 |
| 3,346,293 A | 10/1967 | Wilcox | |
| 3,601,919 A * | 8/1971 | Nixon et al. | 43/21.2 |
| 3,903,633 A * | 9/1975 | Hutcherson | 43/17 |
| 4,730,408 A * | 3/1988 | Miller | 43/15 |
| 5,245,778 A * | 9/1993 | Gallegos et al. | 43/15 |
| 6,430,864 B1 * | 8/2002 | Thomure et al. | 43/15 |
| 6,775,943 B2 * | 8/2004 | Loughman | 43/2 |
| 6,898,893 B1 * | 5/2005 | Mukdaprakorn | 43/21.2 |
| 7,231,737 B2 | 6/2007 | Bradford | |
| 7,434,348 B1 * | 10/2008 | Welch | 43/17 |
| 7,627,977 B2 | 12/2009 | Denny | |
| 7,784,213 B1 | 8/2010 | Primos | |
| 8,087,199 B2 * | 1/2012 | Roe | 43/2 |
| 2004/0194365 A1 | 10/2004 | Summers et al. | |
| 2004/0250461 A1 | 12/2004 | Dryer | |
| 2007/0151139 A1 | 7/2007 | O'Dell | |
| 2008/0007813 A1 | 1/2008 | Wang et al. | |
| 2008/0216381 A1 | 9/2008 | Wyant | |
| 2009/0007479 A1 | 1/2009 | Jerome, Sr. | |
| 2010/0064569 A1 | 3/2010 | Wyant | |
| 2010/0115818 A1 | 5/2010 | Rogers | |
| 2010/0175301 A1 | 7/2010 | Roe | |
| 2011/0232153 A1 * | 9/2011 | Jennings et al. | 43/2 |
| 2012/0017487 A1 * | 1/2012 | O'Keefe | 43/21.2 |

* cited by examiner

*Primary Examiner* — Darren W Ark  
*Assistant Examiner* — Lisa Tsang  
(74) *Attorney, Agent, or Firm* — Hovey Williams LLP

(57) ABSTRACT

A turkey decoy for receiving and supporting a real or artificial turkey tail fan is disclosed herein. The turkey decoy can be configured in a stake-supported configuration where the turkey tail fan is supported on a stake and remotely movable by a hunter operating the turkey decoy. Alternatively, the turkey decoy can be configured in a clamp-supported configuration where the turkey tail fan is supported on a clamp that a hunter can hold or attach to a variety of structures in the hunting environment.

24 Claims, 4 Drawing Sheets

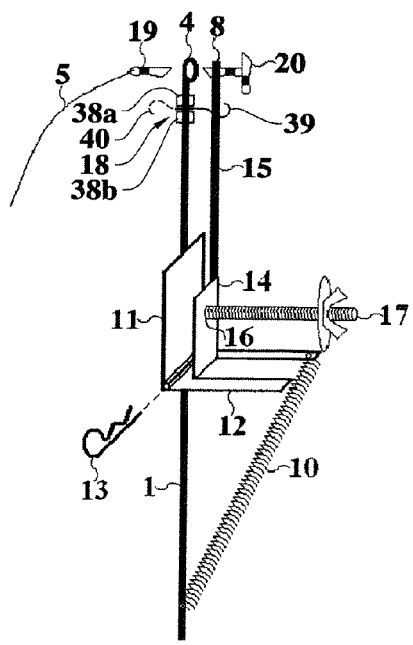
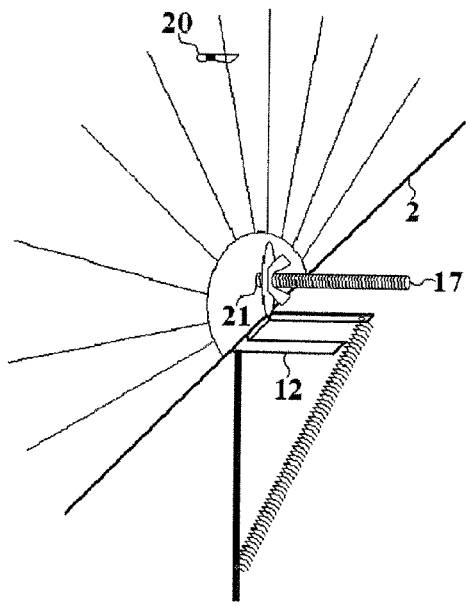
FIG. 2A.
FIG. 2B.
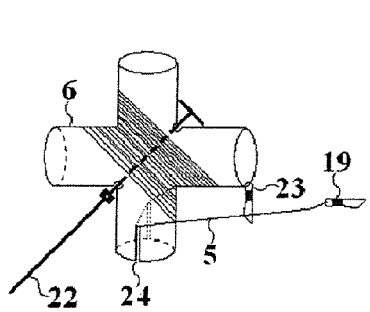
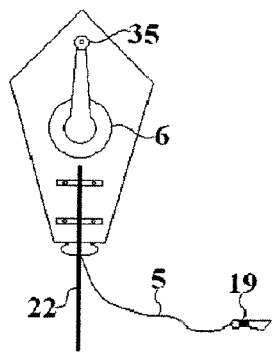
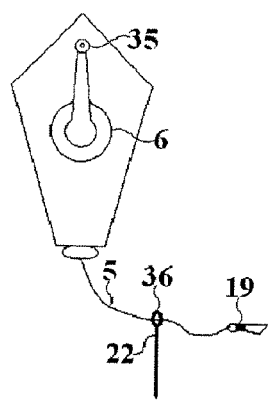
FIG. 3A.
FIG. 3B.
FIG. 3C.

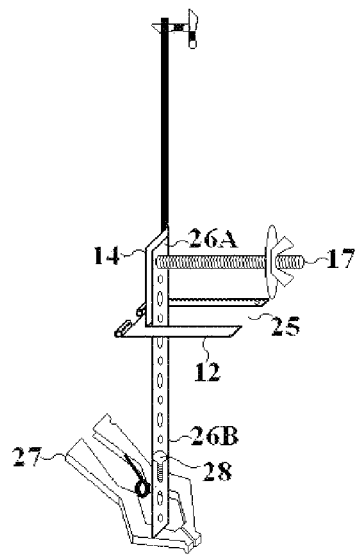
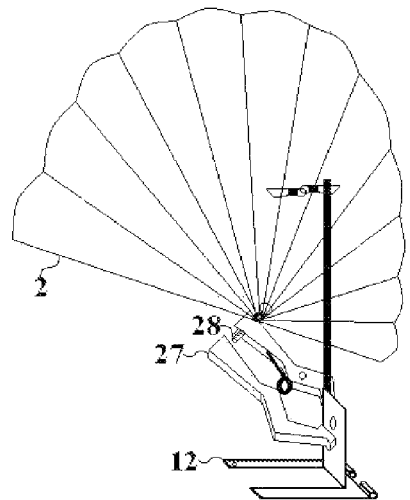
FIG. 4A.   FIG. 4B.
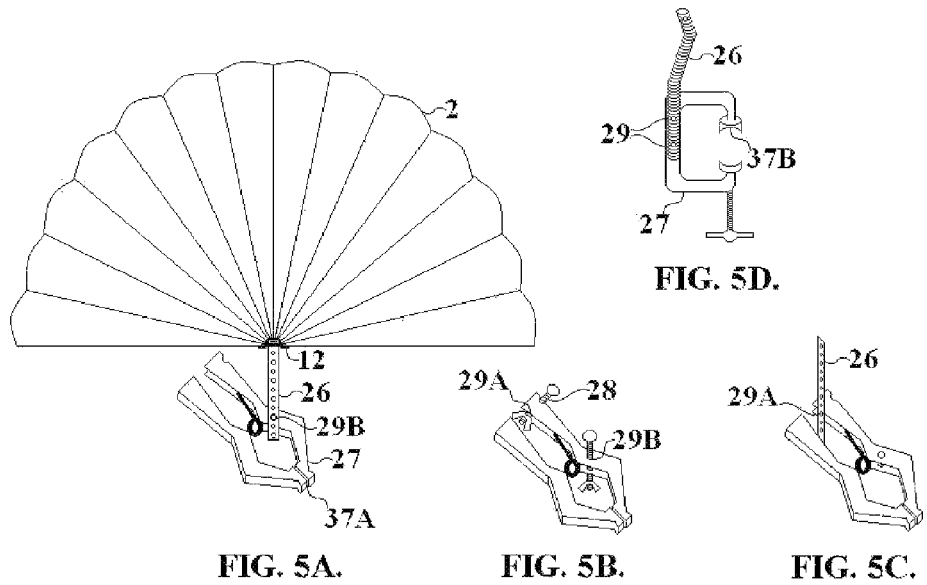
FIG. 5A.   FIG. 5B.   FIG. 5C.
FIG. 5D.

TURKEY TAIL FAN SUPPORT DECOY

CROSS-REFERENCE TO RELATED APPLICATIONS

This application claims priority to U.S. Provisional Patent Application Ser. No. 61/374,568, filed Aug. 17, 2010 and U.S. Provisional Patent Application Ser. No. 61/375,211, filed Aug. 19, 2010. The entire disclosures of the above-referenced provisional applications are incorporated herein by reference.

BACKGROUND OF THE INVENTION

There have been several disclosures of wildfowl/turkey decoys that include a turkey tail or remotely movable parts. Animated decoys have distinct, obvious advantages over standard, sedentary decoys. However, previous designs have been prohibitively complex or have not focused on the key component to attracting gallinaceous birds whose tail fan is central to male-female and male-male display. The tail fan, specifically the raising and lowering of the tail fan, is at the center of display. The act and timing of raising and lowering the tail fan communicates rank, signals dominance, and advertises age and fitness.

Several disclosures of decoys include a remotely movable tail, but also include or depend upon a turkey decoy body. For example, U.S. Pat. No. 6,775,943 (Loughman) discloses a movable turkey tail attached to a stake, remotely operated by the user via a cord. However, this design only produces a side to side motion, it does not produce a raising or lowering motion. Similarly, US2010/0115818 (Rogers) discloses a decoy that utilizes a remotely movable tail fan whose function is dependent upon specific structures of the decoy body, such as a hollow interior, mounting surfaces, and a base connected to the body. Other disclosures such as US2004/0250461 (Dryer), have utilized only a turkey tail fan, but have not disclosed means of attaching the tail to structures other than the rigid stake member, or to multiple structures. U.S. Pat. No. 7,784,213 (Primos) discloses a collapsible fan holder that aides in portability of a turkey tail fan. This device can be attached to a turkey decoy body with movement capability, such as that disclosed by US2010/0115818 (Rogers). U.S. Pat. No. 7,784,213 (Primos) neither discloses a means of attaching such a holder to a remotely movable tail fan stake that can function independent of a turkey body, nor does it disclose a device that could be used to readily detach and attach a turkey tail fan to and from multiple structures.

Other decoys, such as US2008/0078113 (Denny) and US2004/0194365 (Summers), utilize head, neck, body, and tail sections, requiring complex movable parts throughout the decoy to provide motion to the head/neck and tail. Although realistic and likely effective, it is unnecessary, in terms of the effectiveness of the decoy, for the head/neck to move, or for the entire body to have movable parts, or for the decoy to be dependant upon motors or servos for operation. The only motion required for enhanced effectiveness over a static decoy, is raising and lowering of the tail. Certainly, the complexity and cost of such devices outweigh their practicality and effectiveness.

U.S. Pat. No. 7,231,737 (Bradford) discloses a remotely operated tail fan, whose individual feathers move between a lowered position in which the feathers are gathered and a raised position in which the feathers are spread as the result of effort from the user. A spring biases the individual feathers to the lowered and gathered position.

US2004/0250461 (Dryer) discloses a similar invention to Bradford. This design also discloses a remotely operated tail fan with elongated members that spread as the tail rises and gathers as the tail lowers as the result of effort from the user biased against a spring. This design also utilizes a slide and common attachment of elongated supports. The slides of both Dryer and Bradford function as movable load ends. Dryer discloses a weighted slide that moves upon elongated rods. This complex weighted slide is used to raise and lower the tail fan and is required to open and close the tail fan. The slide is attached to a spring, which pulls the weighted slide toward the terminus of the tail, this positioning and weight of the slide causes the lowering and gathering of the elongated members. This design relies heavily upon angle requirements for appropriate weight distribution and functionality. For example, the design requires an angle between members to pull the fan to the upright position, and to lift a point to the level of the pivot point to allow the assembly to move upward from the lowered position. It therefore requires a stop means to prevent the assembly from lowering too far beyond the pivot point.

Similar to Bradford and Dryer, US2010/0115818 (Rogers) also discloses a tail fan with both longitudinal and lateral motion. However, in this disclosure, effort from the user results in a lowered tail fan position. Because spring bias, not effort by the user, supports the tail in the upright position, the tail fan is free to move independent of the user, and this movement, often caused by wind against the open, upright fan, is generally sporadic and unnatural.

Previous disclosures include components that are unnecessary or prohibitively complex and/or rely heavily upon invoking a feather spreading and gathering motions, which do not add to the effectiveness of the raising and lowering motions in a decoying situation. In previous disclosures, the additional motion does, however, add greatly to the complexity and potential difficulty and error in operation, as well as reduces the overall feasibility of the decoys.

Previous disclosures neither provide the opportunity to attach a real turkey tail fan, including tail feathers and connective tissue, that have been removed from a turkey and fixed into an open position, to a structure used for decoying; nor do they provide means of readily detaching and attaching a turkey tail fan to and from multiple structures. A component used to lock a movable tail fan decoy in an upright position also has not been disclosed. This is necessary when the user operates a movable tail fan decoy by hand at the site of the decoy, and when a tail fan decoy is used for cover and the wind precludes the user from attaching a decoy to their weapon.

SUMMARY OF THE INVENTION

An object of the present invention is the fastening of a turkey tail fan to a support structure which can, itself, be attached to other structures to display and move the tail fan for the purpose of decoying turkeys. The present invention does not require the use or accompaniment of a turkey body, or any other part or depiction of a turkey. One embodiment of the present invention includes a hinge with a removable pin; one plate of the hinge is attached to a support stake, the other attached to a turkey tail fan. Other embodiments include a rigid member rotating upon a pivot point which is located upon a support stake or a projection extending at an angle from the upper portion of a support stake. Embodiments can utilize springs to provide tension bias to either raise or lower the turkey tail fan. In each embodiment, the turkey tail fan attachment surface can include features which allow attachment to multiple structures.

In a preferred embodiment, a hole at the end of the support stake serves as a fulcrum, through which a cord can be threaded. The tail fan attachment plate includes an extension perpendicular to the plate's surface; this extension includes a feature for fastening the base of the tail fan proximally, and connecting the fulcrum to the load end distally. A spring can be used to connect the distal end of the tail fan attachment plate to the support stake, thus providing tension bias to return the fan to a lowered position.

The load end and effort end are connected by a cord that can be used to remotely raise and lower the tail fan, or the distance between the fulcrum and effort can be reduced by the user at the site of the decoy. The effort end includes a spool or reel designed to adjust cord length and maintain organization and includes means of staking the spool to the ground. Upon separation of the hinge plates, the tail fan attachment plate can be attached to other support structures such as other decoys, or remotely operable decoy devices. The tail fan attachment plate can also be attached to a clamp, which can then be attached to a variety of structures capable of supporting a tail fan for the purpose of decoying or to provide cover while pursuing turkeys.

BRIEF DESCRIPTION OF THE DRAWINGS

FIG. 2A illustrates a tail fan attachment plate and associated members.

FIG. 2B illustrates details of the inner portion of a raised turkey tail fan attached to a tail fan attachment plate.

FIG. 3A illustrates an embodiment of a cord spool with a stake member.

FIG. 3B illustrates an embodiment of a cord reel with a stake member.

FIG. 3C illustrates an embodiment of a cord reel utilizing a detached stake member.

FIG. 4A illustrates a tail fan attachment plate attached to a clamp member by fasteners and a connecting member.

FIG. 4B illustrates a depiction of a tail fan attached directly to a clamp member, which is attached to the tail fan attachment plate.

FIG. 5A illustrates a tail fan attached to the tail fan attachment plate at one end of a connecting member, and the other end attached to a clamp member.

FIGS. 5B and 5C illustrates attachment of a turkey tail fan to a clamp on both axes of the clamp.

FIG. 5D illustrates a threaded clamp member with rounded attachment surfaces, a connector comprised of rounded material, and multiple clamp attachment apertures.

DETAILED DESCRIPTION OF THE PREFERRED EMBODIMENTS

The present invention may be embodied in several forms, herein are examples of the principles of the invention, disclosed with the understanding that they are not intended to limit the invention to these specific embodiments.

Figures 1A, 1B:
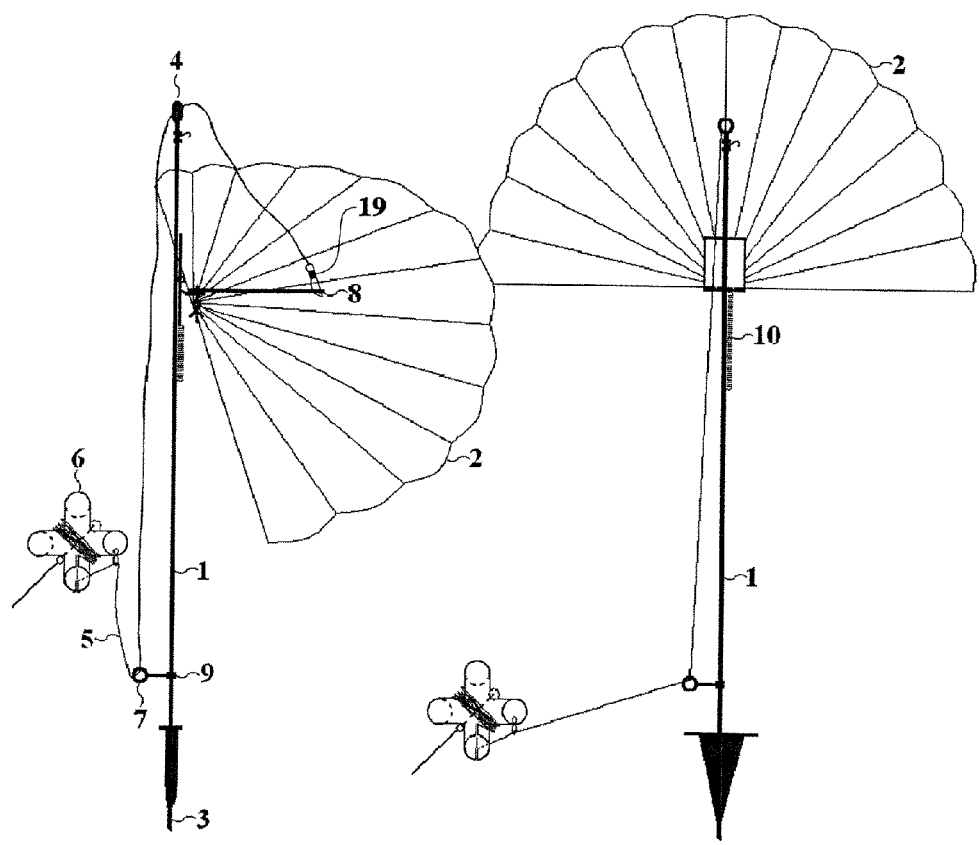
FIG. 1A illustrates the rigid stake member and associated components of the present invention, with a lowered turkey tail fan.
FIG. 1B illustrates the rigid stake member and associated components of the present invention, with a raised turkey tail fan.

FIG. 1A shows a rigid stake member (1) and associated components of one of the preferred embodiments of the present invention, with a lowered turkey tail fan (2). The present invention does not require the use or accompaniment of a turkey body, or any other part or depiction of a turkey. The stake includes a first end portion configured for insertion into the ground (3), and a second end portion having a guide hole (4) that serves as a fulcrum. A cord (5) is fed from the effort end (6) of a spool or reel, through a first guide (7) having a guide hole, and a second cord guide (e.g., the fulcrum) (4), and then attached to the load end (8). A closable locking mechanism (19) can be used to attach the cord (5) to the load end (8). The fan is (2) raised by reducing the distance between the load end (8) and the fulcrum (4). This can be easily achieved by the user remotely pulling or winding the spool, which includes a stake member (22), or by raising the fan by hand at the site of the decoy. The simple configuration of these components enables the position of the fan to be easily adjustable.

The first cord guide (7) can be adjustable, and is comprised of an eyebolt or similar component with a suitable guide hole, threaded into an adjustable shaft-gripping element, such as a shaft stop collar (9), for example. This guide assembly (7,9) allows for the adjustment of the height (vertical adjustment) and angle (vertical adjustment) at which the effort ends acts. Adjusting the height of this assembly (7, 9) is advantageous in avoiding potential obstructions to the cord, or to match vegetation height, thereby hiding the cord. However, the first cord guide (7) can also be fixed and integral with the rigid stake member (1) by forming a hole in the rigid stake member (1) (refer to 7 of FIG. 7A.), thereby increasing the simplicity of the device. Because this device only invokes motion vertically, and does not include the spreading and gathering of individual feathers, it is much less prone to failure, and is more simple, efficient, and effective.

FIG. 1B shows the rigid stake member (1) of FIG. 1A with the turkey tail fan (2) raised. Tension bias from the user while the fan is in the upright position, results in optimal control of the raised tail fan, and greatly reduces sporadic or unnatural motion caused by wind. A detachable spring (10) is extended in the raised position; tension bias from the spring returns the fan to a lowered position. The rigid stake member (1) is of adequate height to mimic the tail fan height of a wild turkey, to remain above typical vegetation, and to adapt to commercially available decoys.

FIG. 2A is a perspective view of the tail fan attachment plate (12) and associated members in a raised position. Toward the upper end of the rigid stake member, a hinge plate (11) is attached to the stake (1) in a fixed position. This fixed hinge plate (11) is temporarily attached to the tail fan attachment plate/structure (12), via a removable pin (13), which expedites separation of the two plates (11, 12). The tail fan attachment plate (12) is advantageous in that it provides a simple, effective means of attaching, supporting, moving, and displaying a turkey tail fan (2). The tail fan attachment plate (12) also maximizes the mobility of the current invention. The tail fan attachment plate (12) can readily be detached from one support structure, such as a stake, and secured to another support structure, such as a decoy, decoy device, or spring-loaded or threaded clamp, which can then be attached to any structure for displaying the turkey tail fan (2) for the purpose of decoying or providing cover for the user, such as objects in the environment, other decoys or decoy devices, camera support structures, or weapons.

The tail fan attachment plate (12) includes a substantially perpendicular surface (14). This perpendicular surface can include an extension (15) which provides additional leverage while raising the tail fan. The perpendicular surface can also include one or more holes (16) where a turkey tail fan can be fastened via an externally threaded fastener/rod (17), or the tail fan attachment plate can include other means of securing and detaching a turkey tail fan. In some instances, high winds, a lack of wind, the angle between the stake and the ground, or combination thereof, will preclude the fan from lowering by its own weight. Therefore, a detachable spring (10) can be fastened between the distal end of the tail fan attachment plate (12) and the rigid stake member (1). The spring can be fastened by looping its terminal loops through holes in the tail fan attachment plate (12) and the rigid stake member (1) or by other means.

Latching the load end (8) to the fulcrum (4) or area nearby the fulcrum (4), is necessary to lock the fan into an upright position; therefore, a latching mechanism (18) is located between the fixed hinge surface (11) and the fulcrum (4) to latch the fulcrum (4) to the load end (8). The latching mechanism (18) includes an S-hook (39) locked into place by upper and lower shaft stop collars, (38a) and (38b), respectively. Latching can also be achieved by using a magnet, clamp, or one or more corresponding holes through which an S-hook or other latching mechanism can be inserted. In FIG. 2A, the S-hook (39) is positioned to hook around extension (15) to thereby lock the fan into an upright position. Further, the phantom position (40) of the S-hook (39) in FIG 2A depicts one possible position of the S-hook (39) when the load end (8) is unlatched from the latching mechanism (18). Temporarily latching the tail fan into an upright position is advantageous in some decoying situations; for example, when the user requires hands-free use while operating the decoy at the site of the decoy. Using this assembly, the user can easily raise or lower the tail fan at the location of the decoy while it is attached to a stake, then lock the fan into an upright position. In such uses, the cord is generally fully wound or detached. Locking the fan in an upright position and using it for cover ensures mobility by allowing use of a mobile turkey tail fan decoy, without having to clamp the decoy to a weapon in high winds.

The terminus of the cord (5) can be attached directly to the load end (8), or to expedite connection and disconnection, a closable locking mechanism (19) can be attached to the cord terminus and the load end. To provide additional support to an attached turkey tail fan (2), a closable locking mechanism (20) can be used to connect the load end (8) to a support structure within the turkey tail fan, such as central tail feather shafts.

FIG. 2B shows the inner portion of a raised turkey tail fan (2) attached to the perpendicular surface (14) of the tail fan attachment plate (12) with a threaded fastener (17). A closable locking mechanism (20) can be connected to a central feather shaft to provide additional support. The turkey tail fan (2) can be a turkey tail fan (2) removed from a turkey and fixed into an open position (2), secured as shown by means of a hole drilled through the connective and feather tissue of the base (21) or secured by other means. The turkey tail fan (2) can also be an artificial tail fan, or a tail fan comprised of organic and artificial components, such as actual turkey feathers whose proximal shaft ends are inserted into plastic tubing. An advantage to using a turkey tail fan (2) that has been removed from a turkey and fixed into an open position is unparalleled realism and an unparalleled response by wild turkeys to the decoy. A fixed turkey tail fan (2) is also more durable than other tail fans.

Referring to FIGS. 3A, 3B, and 3C an advantageous feature of the present invention is that it maintains the upright position while maintaining realism, especially in windy situations or when hands-free use of the decoy is required. A lockable spool (6) with an attached stake member (refer to FIG. 3A.), reel with an attached stake member (refer to FIG. 3B.), reel utilizing a detached stake member (refer to FIG. 3C.), provides a mechanism to organize and manage the cord. The user winds or pulls the spool or reel to reduce the distance between the effort and load, thereby causing the turkey tail fan (2) to rise. Advantageously, the decoy device may utilize a variety of commercially available lockable spools and reels, including but not limited to, a kite string spool or fishing reel.

Referring to FIGS. 3A and 3B the spool or reel includes a stake member (22) which supports the spool or reel. When the stake (22) is forced into the ground to the depth of the spool or reel, additional cord (5) cannot be released from the spool because of tension between the spool or reel and the surface of the ground. The spool or reel can also include a locking mechanism (23) and/or grooved features (24) or other means of regulating the amount of cord released during operation or to prevent unraveling during transport. The spool or reel stake member (22) can also be inserted into the guide (7) of the rigid stake member (1) (FIG. 1A) and the cord (5) above the guide (7) can be locked into the closable locking mechanism (23) to aide in portability when the cord (5) is fully spooled. The user unwinds or releases the spool or reel to lower the tail fan (2), with the assistance of the pull of the detachable spring (10). The terminus or other portion of the cord could also readily be attached to a remotely operable electric motor mounted near the base of the stake.

FIG. 3B illustrates a reel, with an enclosed or exposed spool (6), with an attached stake member (22). This type of embodiment can also be used to maintain organization of the cord (5) and manage the position of the tail fan (2). The handle (35) of the reel can be locked into position to prevent the release of cord (5), or the stake member (22) can be forced into the ground to a depth where tension between the ground and the stake member (22) or reel prevents the release of cord (5).

FIG. 3C illustrates a reel, with an enclosed or exposed spool (6) utilizing a detached stake member (22) with a guide hole (36). This type of embodiment can also be used to maintain organization of the cord (5) and manage the position of the fan tail (2). Prior to securing the closable latch (19) of the cord (5) to the tail fan attachment plate (refer to 12 of FIG. 2A.), the cord is threaded through the guide hole (36) of the stake member (22). By locking the handle of the reel (35), additional cord (5) cannot be released, and by forcing the stake member (22) into the ground to a depth that secures its position, the reel is held in place by tension bias against the stake member (22).

Referring to FIG. 4A, the tail fan attachment plate (12) can be attached to a spring clamp (27) by fasteners (28) and a connecting member (26A). A spring-biased hand clamp or threaded C-clamp can be used, but a spring clamp with adequate tension is advantageous because of the ease and expediency of attachment and removal. The tail fan attachment plate (12) includes an opening (25) in its surface where the distal end of a connecting member (26A) can be inserted and attached to the perpendicular surface (14) of the tail fan attachment plate (12) via the same fastener (17) that attaches the fan (2), or by other fastening means. The connecting member (26) in this embodiment is flexible enough to bend in multiple planes in order to conform to multiple surfaces, yet rigid enough to support the tail fan attachment plate and turkey tail fan.

The turkey decoy system of the present invention can be readily shifted from the stake-supported configuration (depicted in FIGS. 1A and 1B) to the clamp-supported configuration (depicted in FIG. 5A) by removing the hinge pin (13), detaching the cord (5) and spring (10) from the rigid stake assembly, and attaching the proximal end of the connecting member (26B) to a clamp (27) with a threaded fastener (28) or other fastening means. Once in the clamp-supported configuration, the tail fan attachment plate (12), with a secured turkey tail fan (2), can be attached to a variety of surfaces for decoying. The turkey decoy system of the present invention can also be readily shifted from the clamp-supported configuration (depicted in FIG. 5A) to the stake-supported configuration (depicted in FIGS. 1A and 1B) by detaching the proximal end of the connecting member (26B) from the clamp (27), aligning the openings of the hinge plate (11) and openings of the fan attachment plate (12), inserting the hinge pin (13) into the aligned openings of the hinge plate (11) and the fan attachment plate (12), and attaching the cord (5) and spring (10) to the rigid stake assembly. This quick, simple portability and adaptability is advantageous in field situations, where the user is mobile and utilizing a variety of decoying situations.

Referring to FIG. 4B, a tail fan (2) can be fastened directly to a clamp (27) using a fasteners (28), without utilizing the connecting member (26 of FIG. 4A). The tail fan and clamp assembly can be attached directly to the tail fan attachment plate (12) and the fixed hinge plate (11 of FIG. 2A) of the rigid stake member (1 of FIG. 2A). This configuration is advantageous because it expedites tail fan attachment to a weapon or other structure from the stake assembly, and visa versa. However, possible attachment configurations are limited without the use of a connecting member.

Referring to FIGS. 5A, 5B, 5C and 5D, a tail fan (2) attached to the tail fan attachment plate (12) at one end of the connecting member (26), and the other end attached to a clamp (27). The clamp (27) can utilize spring (FIG. 5A, 5B, 5C) or threaded (FIG. 5D) structures for fastening. The clamp (27) can include flat (37A) or rounded (37B) attachment surfaces, to conform securely to flat or rounded surfaces. The clamp (27) includes attachment apertures (29) for receiving a fastener (28). Referring to FIG. 5A, 5B, 5C, the apertures (29A, 29B) and their fasteners (28) can be positioned along axes that are substantially perpendicular to one another for tail fan attachment on both axes. Referring to FIG. 5D, multiple apertures (29) on the same axis can be utilized to ensure that the attached tail fan and connector (26) do not rotate upon the attachment apertures (29). The connecting member (26) can be any material that is flexible enough to conform to alternate angles and axes, yet rigid enough to support a tail fan attachment plate (12) and tail fan (2); such as flat material (FIG. 5A, 5B, 5C) or round material (FIG. 5D). Because of the attachment alternatives and the flexibility of the connecting member (26), the same clamp (27) can be attached to various surfaces lying at various angles, thereby allowing the decoy device to be attached to a multitude of structures capable of supporting a turkey tail fan (2) for the purpose of decoying turkeys.

Figure 6:
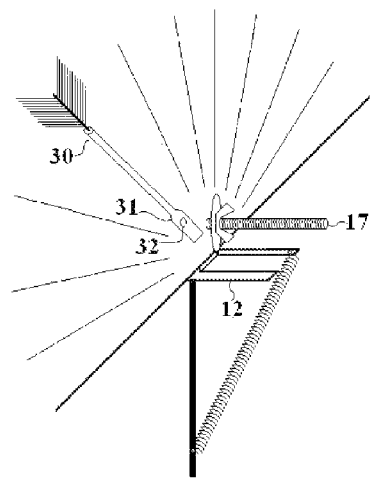
FIG. 6 illustrates a collapsible turkey tail fan comprised of individual turkey tail feathers removed from a turkey tail and inserted into slightly flexible, yet rigid tubes, which rotate upon a common axis.

FIG. 6 illustrates a collapsible turkey tail fan (2) comprised of individual turkey tail feathers removed from a turkey tail and inserted into slightly flexible, yet rigid tubes, which rotate about a common axis to provide individual feather support. The tubing (30) is flattened at one end (31) and a hole (32) is located in the flattened end. The hole in each of a plurality of tubes provides a means of inserting a fastener (17), which serves as an axis for the feathers to rotate upon while spreading and gathering. The fastener (17) also provides a means to increase and reduce tension among the flattened ends of the tubing, such that when the fastener is tightened, the feathers are spread, when the fastener is loosened, the feathers are allowed to collapse. This allows the user to select positions of the individual feathers to create the desired appearance of the tail fan (2). The holes also correspond to a hole in the perpendicular surface (refer to 14 of FIG. 2A.) of the tail fan attachment plate (12), thereby providing means of attachment to the other components of the present invention.

Although the spreading and gathering motion is not necessary for or used in decoying situations with the present invention, this component does allow for the advantages of utilizing individual feathers removed from a turkey, while maintaining the portability often associated with collapsible turkey tail fans, which are often of artificial origin.

Figures 7A, 7B:
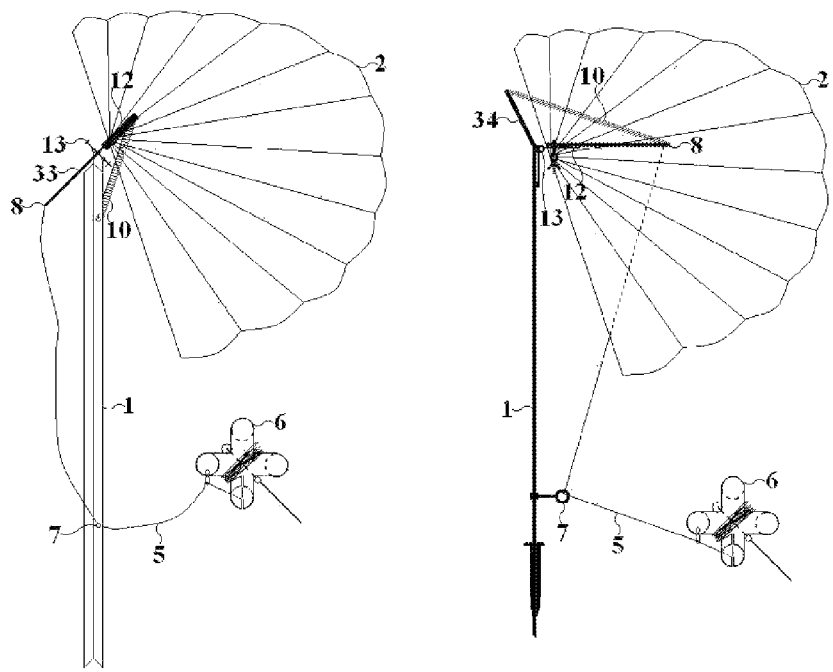
FIG. 7A illustrates an alternate embodiment of the present invention, which includes a rigid member with tail fan attachment at one end and a load end at the opposite end; the rigid member utilizes a pivot point to rotate upon a stake member.
FIG. 7B illustrates an alternate embodiment of the present invention, including an angled projection and a spring to bias in a raised tail fan position.

FIG. 7A illustrates another embodiment of the present invention and includes a fixed or removable pivot point (13) upon a stake member (1). In this depiction, the stake member (1) includes two surfaces which are manufactured such that they are substantially at a 90 degree angle to one another, such as with angle iron. This type of stake member (1) can be used in other embodiments of the invention. The pivot point (13) allows rigid member (33) to pivot upon the rigid stake member (1). A guide (7) located at the lower portion of the rigid stake member (1) assists the user by further serving as a fulcrum (refer to 4 of FIG. 1A.). A turkey tail fan (2) is attached to and supported by a tail fan attachment structure (12) located at one end of the rigid member (33); the cord (5) is attached at the other end of the member (33), which thereby serves as the load end (8). The cord (5) passes through a guide (7) in the rigid stake member (1). The user raises the tail fan by exerting pull upon the effort end (6), which causes the load end (8) to pivot to a lower position, and the tail fan end of the rigid member (33) to raise. A spring (10) connecting the distal end of the tail fan attachment structure (12) to the rigid stake member (1) causes the tail fan to lower in the absence of pull from the effort end (6). An advantage of this embodiment is that when the tail fan is lowered, no vertical projections are visible over the lowered tail fan.

Referring to FIG. 7B another embodiment of the present invention includes a projection (34) extending at an angle from the upper portion of a rigid stake member (1). A pivot point (13), such as a hinge pin, connects a tail fan attachment structure (12) to a rigid stake member (1). A guide (7) located at the lower portion of the rigid stake member (1) assists the user by further serving as a fulcrum (refer to 4 of FIG. 1A.). A spring (10) connecting the angled projection (34) to the tail fan attachment structure (12) provides tension to maintain the upright position of the turkey tail fan (2). A cord (5) is attached to the distal end of the tail fan attachment structure or a distal extension of it, thereby serving as the load end (8). The cord passes through a guide (7) in the rigid stake member. Pulling force exerted by the user on the effort end (6) lowers the turkey tail fan, instead of raising it as in other embodiments disclosed herein. An advantage of this configuration is that the tail fan will maintain an upright position without pull from the effort end.

The remainder of this detailed description section contains written description that was not entirely present in the written description section of the original provisional applications to which the present application claims priority. However, the following written description is fully supported by the drawings of the provisional applications to which this application claims priority. Additionally, much of the following description mirrors the written description from the original provisional applications, but has been added to this nonprovisional application simply to provide clear, explicit, literal written support for all the appended claims and potential additional claims.

Interchangeable Turkey Decoy System

A first embodiment of the present invention relates to a turkey decoy system configured for use with a real or artificial turkey tail fan. In this first embodiment, the turkey decoy assembly can comprise a fan support structure configured to be secured to the turkey tail fan, a stake having a first end configured for partial insertion into the ground, and a clamp configured for attachment to a variety of structures. The turkey decoy system can be readily shiftable between a stake-supported configuration and a clamp-supported configuration. When the turkey decoy system is in the stake-supported configuration, the fan support structure can be attached to the stake and detached from the clamp. When the turkey decoy system is in the clamp-supported configuration, the fan support structure can be attached to the clamp and detached from the stake. The turkey decoy system can be a fan-only system that does not include any component or components depicting the body of a turkey.

The fan support structure can be shiftable between a lowered position and a raised position when the turkey decoy system is in the stake-supported configuration. The fan support structure can be configured so it is not shiftable relative to the clamp when the turkey decoy system is in the clamp-supported configuration. The fan support structure can be configured so that it does not cause spreading or gathering of the turkey tail fan during shifting of the fan support structure between the lowered and raised positions.

The turkey decoy system can further comprise a hinge for permitting pivoting of the fan support structure between the lowered and raised positions. The hinge can comprise a removable pin that, when removed, detaches the fan support structure from the stake. The turkey decoy system can further comprise a hinge plate coupled to the stake. The fan support structure can further comprise an attachment plate. The hinge plate and the attachment plate can be pivotably coupled to one another by the removable pin.

The turkey decoy system can further comprise a spring for biasing the fan support structure toward the lowered position. The spring can comprise a first end coupled to the stake and a second end coupled to the fan support structure. The first and/or second ends of the spring can be readily detachable.

The turkey decoy system can further comprise a cord operable, when pulled, to shift the fan support structure either from the lowered position to the raised position or from the raised position to the lowered position. The fan support structure can be biased toward the lowered position. The cord, when pulled, can be operable to shift the fan support structure from the lowered position to the raised position. The turkey decoy system can further comprise a latching mechanism for securing the fan support structure in the raised position. The fan support structure can pivot relative to the stake on a substantially horizontal pivot axis when shifted between the lowered and raised configuration. The latching mechanism can releasably couple the fan support structure to the stake at a location spaced from the pivot axis.

The turkey decoy system can further comprise first and second cord guides coupled to the stake and defining respective first and second guide holes. The cord can extend through the first and second guide holes. The stake can present a second end opposite the first end. The first cord guide can be located closer to the first end than the second end. The second cord guide can be located closer to the second end than the first end. The second cord guide can comprise an adjustable shaft-engaging element for permitting vertical adjustment of the second cord guide along the length of the stake. The adjustable shaft-engaging element can further permit horizontal adjustment the second cord guide around the stake. The turkey decoy system can further comprise an attachment structure fixed to the stake and configured to facilitate attachment of the fan support structure to the stake. The attachment structure can be located between the first and second cord guides. The second cord guide can be located at the second end of the stake. The second cord guide can be substantially aligned with the longitudinal axis of the stake.

The turkey decoy system can further comprise a spool for winding and unwinding the cord. The turkey decoy system can further comprise a cord-locking structure on the spool upon which the cord can be wound so as to selectively prevent unwinding of the cord off the spool. The turkey decoy system can further comprise a remote stake attached to the spool and configured for insertion into the ground to thereby hold the fan support structure in the raised position. The turkey decoy system can further comprise a housing within which the spool is receive and a handle for manually rotating the spool relative to the housing. The housing can define a guide hole through which the cord passes when the cord is wound onto or unwound from the spool. The handle can be selectively lockable to prevent rotation of the spool relative to the housing.

The fan support structure can comprise an externally threaded rod, an internally threaded nut, a first compression member, and a second compression. The first and second compression members can be spaced from one another along the length of the threaded rod. The first and second compression members can present respective opposing first and second compression surfaces. The nut and the first compression member can be receive on the threaded rod in a manner such that tightening rotation of the nut on the threaded rod causes movement of the first compression surface toward the second compression surface. In one embodiment, the nut and the first compression member can be integral with one another. In one embodiment, the threaded rod can be rigidly coupled to the second compression member.

The turkey decoy system can further comprise a first extension member spaced from the threaded rod and extending substantially parallel to the threaded rod. The turkey decoy system can further comprise a spring having a first end coupled to the stake and a second end coupled to the first extension member at a location spaced from the second compression member. The first and/or second ends of the spring can be readily detachable. The turkey decoy system can further comprise a second extension member extending substantially perpendicular to the threaded rod. The turkey decoy system can further comprise a cord operable, when pulled, to pivot the fan support structure relative to the stake on a horizontal pivot axis from a lowered position to a raised position. The cord can be attached to the second extension member at a location spaced from the horizontal pivot axis. The turkey decoy system can further comprise a latching mechanism coupled to the stake and operable to engage the second extension member at a location spaced from the horizontal pivot axis to thereby lock the fan support structure to the stake in the raised position.

The clamp can comprise a connecting member for releasably coupling the fan support structure to the clamp. The clamp can be a threaded C-clamp or a spring-biased hand clamp.

Turkey Decoy Stake Assembly

A second embodiment of the invention relates to a turkey decoy stake assembly for supporting and facilitating movement of a real or artificial turkey tail fan. In this second embodiment, the turkey decoy stake assembly can comprise a stake having a first end configured for insertion into the ground and a fan attachment assembly coupled to the stake and configured to receive and hold the turkey tail fan. The fan attachment assembly can be shiftable between a lowered position and a raised position to thereby permit raising and lowering of the turkey tail fan relative to the stake. The fan attachment assembly can comprise a biasing member for biasing the fan attachment assembly towards the lowered position. The fan attachment assembly can be configured in a manner that does not cause spreading or gathering of the turkey tail fan during shifting of the fan support structure between the lowered and raised positions. The turkey decoy stake assembly can be a fan-only system that does not include any component or components depicting the body of a turkey.

The fan attachment assembly can comprise a hinge for facilitating the pivoting movement. The hinge can comprise a first attachment structure rigidly coupled to the stake, a second attachment structure, and a hinge pin pivotably coupling the first and second attachment structures to one another. The fan attachment assembly can be configured to pivot on a substantially horizontal pivot axis between the raised and lowered positions. The hinge pin can extend along the horizontal pivot axis. The hinge pin can be selectively removable to thereby permit decoupling of the second attachment structure from the first attachment structure. The biasing member can be a spring having a first end coupled to the stake and a second end coupled to the second attachment member. The spring can be a tension spring. The first and/or second ends of the spring can be readily detachable.

The fan attachment assembly can comprise a fan holding mechanism coupled to the second attachment structure and configured to receive and hold the turkey tail fan. The fan holding mechanism can comprise an externally threaded rod, an internally threaded nut, a first compression member, and a second compression. The first and second compression members can be spaced from one another along the length of the threaded rod. The first and second compression members can present respective opposing first and second compression surfaces. The nut and the first compression member can be received on the threaded rod in a manner such that tightening rotation of the nut on the threaded rod causes movement of the first compression surface toward the second compression surface. The nut and the first compression member can be integral with one another. The threaded rod can be rigidly coupled to the second compression member. The turkey decoy stake can further comprise a first extension member spaced from the threaded rod and extending substantially parallel to the threaded rod. The turkey decoy stake can further comprise a spring having a first end coupled to the stake and a second end coupled to the first extension member at a location spaced from the second compression member. The first and/or second ends of the spring can be readily detachable.

The turkey decoy stake assembly can further comprise a second extension member extending substantially perpendicular to the threaded rod. The turkey decoy stake can further comprise a cord operable, when pulled, to pivot the fan support structure relative to the stake on a horizontal pivot axis from a lowered position to a raised position. The cord can be attached to the second extension member at a location spaced from the threaded rod. The turkey decoy stake can further comprise a latching mechanism coupled to the stake and operable to engage the second extension member at a location spaced from the threaded rod to thereby lock the fan support structure to the stake in the raised position.

The turkey decoy stake can further comprise a cord operable, when pulled, to shift the fan attachment assembly from the lowered position to the raised position. The turkey decoy stake assembly can further comprise a latching mechanism for securing the fan attachment assembly in the raised position. The turkey decoy stake assembly can further comprise first and second cord guides coupled to the stake and defining respective first and second guide holes. The cord extends through the first and second guide holes. The stake presents a second end opposite the first end. The first cord guide can be located closer to the first end than the second end. The second cord guide can be located closer to the second end than the first end. The second cord guide can comprise an adjustable shaft-engaging element for permitting vertical adjustment of the second cord guide along the length of the stake. The adjustable shaft-engaging element can further permit horizontal adjustment the second cord guide around the stake. The fan attachment assembly can be coupled to the stake at a location between the first and second cord guides. The second cord guide can be located at the second end of the stake. The second cord guide can be substantially aligned with the longitudinal axis of the stake.

The turkey decoy stake assembly can further comprise a spool for winding and unwinding the cord. The turkey decoy stake assembly can further comprise a cord-locking structure on the spool upon which the cord can be wound so as to selectively prevent unwinding of the cord off the spool. The turkey decoy stake assembly can further comprise a remote stake attached to the spool and configured for insertion into the ground to thereby hold the fan support structure in the raised position. The turkey decoy stake assembly can further comprise a housing within which the spool is receive and a handle for manually rotating the spool relative to the housing. The housing can define a guide hole through which the cord passes when the cord is wound onto or unwound from the spool. The handle can be selectively lockable to prevent rotation of the spool relative to the housing.

Turkey Decoy Clamp Assembly

A third embodiment of the invention relates to a turkey decoy clamp assembly for supporting a real or artificial turkey tail fan. In this third embodiment, the turkey decoy clamp assembly can comprise a clamp configured for attachment to a variety of structures and a fan attachment assembly coupled to the clamp and configured to receive and hold the turkey tail fan. The turkey decoy clamp assembly can be a fan-only system that does not include any component or components depicting the body of a turkey. The fan attachment assembly can be configured in a manner that does not cause spreading or gathering of the turkey tail fan during shifting of the fan support structure between the lowered and raised positions.

The fan attachment assembly can comprise an externally threaded rod, an internally threaded nut, a first compression member, and a second compression member. The first and second compression members can be spaced from one another along the length of the threaded rod. The first and second compression members can present respective opposing first and second compression surfaces. The distance between the first and second compression surfaces can be varied by rotating the nut relative to the threaded rod or the threaded rod relative to the nut.

The nut can be threadably received on the threaded rod in a manner such that tightening rotation of the nut on the threaded rod causes the distance between the first and second compression surfaces to be reduced. The first compression member can be integral with the nut.

The turkey decoy clamp assembly can further comprise an extension member having a distal end coupled to the attachment assembly and a proximal end coupled to the clamp. The distal end of the extension member can be coupled to the threaded rod.

The nut can be fixed to the clamp and the threaded rod can be threadably received in the nut in a manner such that tightening rotation of the threaded rod in the nut causes the distance between the first and second compression surfaces to be reduced. The nut can be integral with clamp. The first compression surface can be defined by a surface of the clamp. The second compression member can be integral with the threaded rod. The clamp can be a threaded C-clamp and/or a spring-biased hand clamp.

It is to be understood that the foregoing describes preferred embodiments of the present invention and that modifications may be made therein without departing from the spirit or scope of the present invention as set forth in the claims. As evident to those skilled in the art, preferred embodiments of the invention are directed to a turkey decoy device, however, the decoy device is readily usable with tail fans of any suitable bird.

The invention claimed is:

1. A turkey decoy system comprising:
a real or artificial turkey tail fan including a base section and a main section extending radially from said base section;
a fan support structure configured to be secured to said base section of said turkey tail fan;
a stake having a first end configured for partial insertion into the ground;
a clamp configured for attachment to a variety of structures,
wherein said turkey decoy system is readily shiftable between a stake-supported configuration and a clamp-supported configuration,
wherein said fan support structure is attached to said stake and detached from said clamp when said turkey decoy system is in said stake-supported configuration,
wherein said fan support structure is attached to said clamp and detached from said stake when said turkey decoy system is in said clamp-supported configuration,
wherein said fan support structure comprises a fan holding mechanism and an extension member, wherein said extension member is rigidly connected to said fan holding mechanism so that movement of one of said extension member and said fan holding mechanism causes a corresponding movement of the other of said extension member and said fan holding mechanism; and
a drive assembly connected to said fan support structure and operable to alternatively shift said fan support structure from a lowered position to a raised position and from said raised position to said lowered position.

2. The system of claim 1, wherein said turkey decoy system is a fan-only system that does not include any component or components depicting the body of a turkey.

3. The system of claim 1, wherein said fan support structure is not configured to cause spreading or gathering of said turkey tail fan during shifting of said fan support structure between said lowered and raised positions.

4. The system of claim 1, further comprising a hinge for permitting pivoting of said fan support structure between said lowered and raised positions, wherein said hinge comprises a removable pin that, when removed, detaches said fan support structure from said stake.

5. The system of claim 1, further comprising a spring for biasing said fan support structure toward said lowered position.

6. The system of claim 1, wherein said drive assembly comprises a cord operable, when pulled, to shift said fan support structure either from said lowered position to said raised position or from said raised position to said lowered position.

7. The system of claim 6, wherein said fan support structure is biased toward said lowered position, wherein said cord, when pulled, is operable to shift said fan support structure from said lowered position to said raised position.

8. The system of claim 7, further comprising a latching mechanism for securing said fan support structure in said raised position.

9. The system of claim 6, further comprising first and second cord guides coupled to said stake and defining respective first and second guide holes, wherein said cord extends through said first and second guide holes, wherein said stake includes a second end opposite said first end, wherein said first cord guide is located closer to said first end than said second end, wherein said second cord guide is located closer to said second end than said first end.

10. The system of claim 9, further comprising an attachment structure fixed to said stake and configured to facilitate attachment of said fan support structure to said stake, wherein said attachment structure is located between said first and second cord guides.

11. The system of claim 6, further comprising a spool for winding and unwinding said cord.

12. The system of claim 1, wherein said clamp is a threaded C-clamp or a spring-biased hand clamp.

13. A turkey decoy system comprising:
a real or artificial turkey tail fan including a base section and a main section extending radially from said base section;
a fan support structure configured to be secured to said base section of said turkey tail fan;
a stake having a first end configured for partial insertion into the ground; and
a clamp configured for attachment to a variety of structures,
wherein said turkey decoy system is readily shiftable between a stake-supported configuration and a clamp-supported configuration,
wherein said fan support structure is attached to said stake and detached from said clamp when said turkey decoy system is in said stake-supported configuration,
wherein said fan support structure is attached to said clamp and detached from said stake when said turkey decoy system is in said clamp-supported configuration,
wherein said fan support structure is attached to said stake via a hinge that allows for pivoting of said fan support structure relative to said stake when said turkey decoy system is in said stake-supported configuration,
a drive assembly connected to said fan support structure and operable to alternatively shift said fan support structure from a lowered position to a raised position and from said raised position to said lowered position.

14. The system of claim 13, wherein said turkey decoy system is a fan-only system that does not include any component or components depicting the body of a turkey.

15. The system of claim 13, wherein said fan support structure is not configured to cause spreading or gathering of said turkey tail fan during shifting of said fan support structure between said lowered and raised positions.

16. The system of claim 13, wherein said hinge permits pivoting of said fan support structure between said lowered and raised positions, wherein said hinge comprises a removable pin that, when removed, detaches said fan support structure from said stake.

17. The system of claim 13, further comprising a spring for biasing said fan support structure toward said lowered position.

18. The system of claim 13, wherein the drive assembly comprises a cord operable, when pulled, to shift said fan support structure either from said lowered position to said raised position or from said raised position to said lowered position.

19. The system of claim 18, wherein said fan support structure is biased toward said lowered position, wherein said cord, when pulled, is operable to shift said fan support structure from said lowered position to said raised position.

20. The system of claim 19, further comprising a latching mechanism for securing said fan support structure in said raised position.

21. The system of claim 18, further comprising first and second cord guides coupled to said stake and defining respective first and second guide holes, wherein said cord extends through said first and second guide holes, wherein said stake includes a second end opposite said first end, wherein said first cord guide is located closer to said first end than said second end, wherein said second cord guide is located closer to said second end than said first end.

22. The system of claim 21, further comprising an attachment structure fixed to said stake and configured to facilitate attachment of said fan support structure to said stake, wherein said attachment structure is located between said first and second cord guides.

23. The system of claim 18, further comprising a spool for winding and unwinding said cord.

24. The system of claim 13, wherein said clamp is a threaded C-clamp or a spring-biased hand clamp.

* * * * *